Patented Sept. 21, 1943

2,329,858

UNITED STATES PATENT OFFICE 2,329,858

TREATMENT OF HYDROCARBONS

Louis Schmerling and Vladimir N. Ipatieff, Chicago, Ill., assignors to Universal Oil Products Company, Chicago, Ill., a corporation of Delaware No Drawing. Application March 31, 1941,
Serial No. 386,108

14 Claims. (Cl. 260—671)

This invention relates to the treatment of aromatic hydrocarbons to produce alkylated aromatic hydrocarbons. More specifically the process is concerned with the production of monoalkylated and poly-alkylated aromatic hydrocarbons in the presence of a granular catalytic material.

It is recognized that in general the catalytic alkylation of aromatic hydrocarbons has been known for some time. However, the present invention differentiates from the prior art on this subject in the use of a particular catalytic material comprising essentially a granular composite of magnesium chloride and a carrier.

In one specific embodiment the present invention comprises a process for producing alkylated aromatic hydrocarbons which comprises subjecting an aromatic hydrocarbon and an alkylating agent selected from the group consisting of olefins and olefin-producing substances to contact under alkylating conditions in the presence of a catalyst containing magnesium chloride as its active ingredient.

Aromatic hydrocarbons, such as benzene, toluene, other alkylated benzenes, naphthalene, alkylated naphthalenes, other poly-nuclear aromatics, etc., which are alkylated by olefinic hydrocarbons as hereinafter set forth, may be obtained by the distillation of coal, by the dehydrogenation and cyclization of aliphatic hydrocarbons and of alkylated aromatic hydrocarbons, and by other methods.

Olefins utilizable as alkylating agents may be either normally gaseous or normally liquid and comprise ethylene and its higher homologs both gaseous and liquid, the latter including various polymers of normally gaseous olefins. Cyclic olefins may also serve as alkylating agents but generally under conditions of operation different from those employed in the alkylation of aromatic hydrocarbons with non-cyclic straight and branched chain olefins. Cycloparaffins with three and/or four carbon atoms in the ring may also be employed as alkylating agents for aromatic hydrocarbons. Olefinic hydrocarbons utilizable as alkylating agents are obtained from any source and comprise products of catalytic and thermal cracking of oils or those obtained by dehydrogenating the corresponding paraffinic hydrocarbons or by dehydrating alcohols.

The addition of an alkyl group to an aromatic hydrocarbon may thus be effected in the presence of a magnesium chloride-containing catalyst using as alkylating agent an olefin or a substance capable of producing an olefin under the operating conditions. Such olefin-producing substances include alcohols and ethers which apparently undergo dehydration, particularly in the presence of magnesium chloride-alumina composites and form olefins which react further with aromatic hydrocarbons to produce desired alkylated aromatic hydrocarbons. Alkyl halides may be employed similarly as these generally lose hydrogen halide in the presence of the above indicated catalysts and the resulting olefinic hydrocarbons serve as alkylating agents. When employing methyl compounds as methanol, dimethyl ether, and methyl halides as alkylating agents, hypothetical methylene is probably formed, which may be represented by the formula $=CH_2$, and possibly serves as the active alkylating or methylating agent. For convenience methylene may herein be considered as the first member of the olefin series which undergoes reaction for example with benzene to produce toluene and poly-methyl benzenes while other aromatic hydrocarbons may similarly yield other methylated aromatic hydrocarbons. The different alkylating agents or methylating agents, however, are not necessarily equivalent in their action nor used under the same conditions of operation to form desired products.

Suitable catalysts for use in effecting the process of the present invention comprises composites of magnesium chloride and a carrier such as alumina, silica-alumina composites, clays, diatomaceous earth, charcoal, etc. The different carriers which may be employed are not necessarily equivalent in their action.

The proportions of carrier and magnesium chloride may be varied as desired to make catalyst composites of different activities. Thus it has been found possible and practical to make stable granular catalysts resistant to disintegrating influences by using from about 5 to about 50% by weight of magnesium chloride and from about 95 to about 50% by weight of activated alumina or an alumina-containing carrier. These materials in finely powdered form, after thorough mechanical mixing, may be subjected to drying, pelleting, and heating operations to produce formed particles of catalyst suitable for use as alkylation reactor filling material. A suitable carrier may also be impregnated with an aqueous solution of magnesium chloride, dried and calcined to form a magnesium chloride-carrier composite suitable for use in promoting the alkylation of an aromatic hydrocarbon.

Alkylations of the type hereinabove set forth may also be effected in the presence of hydrogen and/or of hydrogen chloride. There is little or no carbon formation upon the catalyst when alkylations are carried out under hydrogen pressure but carbon formation does occur to a substantial extent in the absence of hydrogen. Hydrogen chloride introduced to the reaction mixture appears to exert a promoting effect upon the reaction in the presence of the magnesium chloride-containing catalyst, particularly when the alkylating agent employed does not contain a substantial proportion of combined halogen.

In effecting reaction between aromatic hydrocarbons and alkylating agents as olefinic hydrocarbons according to the process of the present invention, the exact method of procedure varies with the nature of the reacting constituents. A simple procedure, utilizable in the case of an aromatic hydrocarbon which is normally liquid or if solid is readily soluble or dispersible in a substantially inert liquid and a normally gaseous or liquid olefinic hydrocarbon, consists in contacting the aromatic and olefinic hydrocarbons with a composite of magnesium chloride and a carrier at a temperature of from about 150° to about 500° C. but preferably between about 250° and about 350° C. under a pressure of from substantially atmospheric to approximately 300 atmospheres. Intimate contact of the reacting components with the catalyst is effected by passing the reaction mixture through a fixed bed of the granular catalyst containing magnesium chloride or the reacting components may be mixed with finely divided catalyst in a substantially fluid type of operation. In the hydrocarbon mixture subjected to alkylation treatment it is preferable to have present between about 1 and about 20 molecular proportions of aromatic hydrocarbon per 1 molecular proportion of olefinic hydrocarbon in order to diminish olefin polymerization and to favor interaction of olefinic hydrocarbons with aromatic hydrocarbon or mixture of aromatic hydrocarbons being treated.

Thus a hydrocarbon mixture containing normally liquid aromatic hydrocarbons and a fraction containing olefinic hydrocarbons are commingled and passed through a reactor containing the catalyst such as a composite of magnesium chloride and alumina, or at least a portion of the aromatic hydrocarbon is charged to such a reactor while the fraction containing olefinic hydrocarbons as such or preferably diluted by another portion of the aromatic hydrocarbon being treated, is introduced at various points between the inlet and outlet of the reaction zone in such a way that the reaction mixture being subjected to contact with the granular magnesium chloride-containing catalyst will at all times contain a relatively low proportion of the olefinic hydrocarbon and thus favor alkylation rather than polymerization.

While the methods of passing the aromatic and olefinic hydrocarbons, either together or countercurrently, through a suitable reactor containing the granular catalyst are generally customary procedures, the condensation or alkylation reaction between aromatic and olefinic hydrocarbons may also be effected in a closed vessel in which some of the reacting constituents are in fluid phase and in which the catalyst is preferably in finely divided form and maintained in dispersion or suspension by some method of agitation. Reacting constituents may also be contacted in mixed phase to effect a similar type of reaction. The choice of operating procedure is dependent upon the circumstances such as the temperature and pressure found to be most effective for producing the desired reaction between particular aromatic and olefinic hydrocarbons.

A composite of magnesium chloride and a carrier is a preferred catalyst as it permits continuous alkylation with a fixed catalyst bed and thus avoids mechanical problems as well as oxidation and corrosion difficulties encountered in alkylation carried out in the presence of sulfuric acid. A magnesium chloride-carrier composite also has the advantage over supported aluminum chloride in that magnesium chloride contained in the composites forms substantially no addition compounds or complexes with aromatic and/or olefinic hydrocarbons.

The reactions between olefinic and aromatic hydrocarbons in the presence of supported magnesium chloride are basically of a relatively simple character although they may be accompanied by certain amounts of destructive hydrogenation when the alkylation reaction is carried out under a relatively high hydrogen pressure at a temperature above about 350° C. Apparently a typical alkylation reaction involves the addition of the aromatic hydrocarbon to the double bond of an olefinic hydrocarbon to produce an alkylated aromatic hydrocarbon which may in turn undergo further reaction with one or more molecular proportions of the olefinic hydrocarbon thus producing di-alkylated aromatic and poly-alkylated aromatic hydrocarbons. Within certain limits it is possible to produce mainly mono-alkylated aromatic hydrocarbons by proper adjustment of catalyst activity, ratio of olefinic to aromatic hydrocarbons, operating conditions of temperature, pressure, rate of feed, etc.

The reaction between an aromatic hydrocarbon and a hexene or other normally liquid olefin of higher molecular weight may also involve depolymerization or splitting of the olefin into olefin fragments of lower molecular weight which react with the aromatic hydrocarbon to produce alkylated aromatic hydrocarbons. Thus benzene and di-isobutene or tri-isobutene react and yield tertiary butyl benzene and poly-tertiary butyl benzenes while nonene and benzene may yield both butyl and amyl benzenes by so-called de-polyalkylation.

In general, the products formed by interaction of an olefinic hydrocarbon with a molal excess of an aromatic hydrocarbon are separated from the unreacted aromatic hydrocarbon by suitable means as by distillation, and the unreacted portion of the aromatic hydrocarbon originally charged and generally the poly-alkylated aromatic hydrocarbons formed are returned to the process and mixed with additional quantities of the olefinic and aromatic hydrocarbons being charged to contact with the magnesium chloride-containing catalyst. This recycling of poly-alkylated aromatic hydrocarbons aids in the production of mainly mono-alkylated aromatic hydrocarbons and depresses the formation of more-highly alkylated derivatives. The total alkylated product thus freed is separated into desired fractions by distillation at ordinary or reduced pressure or by other suitable means.

The catalyst compositions indicated in the specification and claims are shown in terms of the proportions of the materials from which the catalyst composites are prepared rather than the exact compositions of the composites which may be somewhat different due to hydrolysis of a portion of the magnesium chloride or to other conversions which are not clearly understood.

The following example is given to illustrate the character of results obtained by the use of the present process although the data presented are only from a selected case and are not introduced with the intention of unduly restricting the generally broad scope of the invention.

80 parts by weight of benzene, 21 parts by weight of propene, and 15 parts by weight of a catalyst formed from 25% by weight of magnesium chloride and 75% by weight of alumina were placed in an autoclave, hydrogen was added to an initial pressure of 100 atmospheres, and the resulting mixture was heated at 350° C. for 4 hours. The catalyst employed had been prepared by impregnating alumina pellets with an aqueous solution of magnesium chloride followed by drying the impregnated pellets. The reaction product removed from the autoclave yielded 10 parts by weight of iso-propyl benzene, 5.2 parts by weight of di-isopropyl benzene, and 2.6 parts by weight of more-highly alkylated benzene. A similar run in the presence of alumina but in the absence of magnesium chloride gave only about 2 parts by weight of a reaction product containing some propylated benzenes.

The nature of the present invention and its commerical utility can be seen from the specification and examples given, although neither section is intended to limit its generally broad scope.

We claim as our invention:

1. A process for producing alkylated aromatic hydrocarbons which comprises subjecting an aromatic hydrocarbon and an alkylating agent to contact at a temperature of from about 150° to about 500° C. in the presence of a catalyst comprising essentially a composite of magnesium chloride and a carrier.

2. A process for producing alkylated aromatic hydrocarbons which comprises subjecting an aromatic hydrocarbon and an alkylating agent to contact at a temperature of from about 150° to about 500° C. under a pressure of from substantially atmospheric to approximately 300 atmospheres in the presence of a catalyst comprising essentially a composite of magnesium chloride and a carrier.

3. A process for producing alkylated aromatic hydrocarbons which comprises subjecting an aromatic hydrocarbon and an alkylating agent to contact at a temperature of from about 150° to about 500° C. under a pressure of from substantially atmospheric to approximately 300 atmospheres in the presence of hydrogen and of a catalyst comprising essentially a composite of magnesium chloride and a carrier.

4. A process for producing alkylated aromatic hydrocarbons which comprises subjecting an aromatic hydrocarbon and an olefin to contact at a temperature of from about 150° to about 500° C. under a pressure of from substantially atmospheric to approximately 300 atmospheres in the presence of hydrogen and of a catalyst comprising essentially a composite of magnesium chloride and a carrier.

5. A process for producing alkylated aromatic hydrocarbons which comprises subjecting an aromatic hydrocarbon and a normally gaseous olefin to contact at a temperature of from about 150° to about 500° C. under a pressure of from substantially atmospheric to approximately 300 atmospheres in the presence of hydrogen and of a catalyst comprising essentially a composite of magnesium chloride and a carrier.

6. A process for producing alkylated aromatic hydrocarbons which comprises subjecting an aromatic hydrocarbon and a normally liquid olefin to contact at a temperature of from about 150° to about 500° C. under a pressure of from substantially atmospheric to approximately 300 atmospheres in the presence of hydrogen and of a catalyst comprising essentially a composite of magnesium chloride and a carrier.

7. A process for producing alkylated aromatic hydrocarbons which comprises subjecting an aromatic hydrocarbon and an alkylating agent to contact at a temperature of from about 150° to about 500° C. under a pressure of from substantially atmospheric to approximately 300 atmospheres in the presence of a hydrogen halide and of a catalyst comprising essentially a composite of magnesium chloride and a carrier.

8. A process for producing alkylated aromatic hydrocarbons which comprises subjecting an aromatic hydrocarbon and an alkylating agent to contact at a temperature of from about 150° to about 500° C. under a pressure of from substantially atmospheric to approximately 300 atmospheres in the presence of hydrogen, a hydrogen halide, and a catalyst comprising essentially a composite of magnesium chloride and a carrier.

9. A process for producing alkylated aromatic hydrocarbons which comprises subjecting an aromatic hydrocarbon and an alkylating agent to contact at a temperature of from about 150° to about 500° C. under a pressure of from substantially atmospheric to approximately 300 atmospheres in the presence of hydrogen and of a catalyst comprising essentially a composite of magnesium chloride and an alumina-containing carrier.

10. A process for producing alkylated aromatic hydrocarbons which comprises subjecting an aromatic hydrocarbon and an alkylating agent to contact at a temperature of from about 150° to about 500° C. under a pressure of from substantially atmospheric to approximately 300 atmospheres in the presence of hydrogen and of a catalyst comprising essentially a composite of magnesium chloride and a siliceous carrier.

11. A process as claimed in claim 3 further characterized in that the alkylating agent comprises essentially an alcohol.

12. A process as claimed in claim 3 further characterized in that the alkylating agent comprises essentially an alkyl halide.

13. A process for producing isopropyl benzenes which comprises subjecting benzene and propene to contact at a temperature of from about 150° to about 500° C. under a pressure of from substantially atmospheric to approximately 300 atmospheres in the presence of hydrogen and of a catalyst comprising essentially a composite of magnesium chloride and alumina.

14. A process for producing alkylated aromatic hydrocarbons which comprises subjecting an aromatic hydrocarbon and an alkylating agent to contact at a temperature of from about 150° to about 500° C. under a pressure of from substantially atmospheric to approximately 300 atmospheres in the presence of hydrogen and of a catalyst comprising essentially a composite of magnesium chloride and a carrier to form a reaction mixture; separating from said reaction mixture mono-alkylated aromatic hydrocarbons, poly-alkylated aromatic hydrocarbons, unconverted aromatic hydrocarbons, and unconverted alkylating agent; and recycling said poly-alkylated aromatic hydrocarbon, unconverted aromatic hydrocarbon, and unconverted alkylating agent to commingle with the mixture of fresh aromatic hydrocarbon, alkylating agent, and hydrogen being charged to contact with the catalyst.

LOUIS SCHMERLING.
VLADIMIR N. IPATIEFF.